United States Patent [19]

Haines et al.

[11] Patent Number: 5,327,638
[45] Date of Patent: Jul. 12, 1994

[54] METHOD OF MAKING A VERTICAL RECORDING HEAD FOR CONTACT AND NEAR CONTACT MAGNETIC RECORDING

[75] Inventors: William Haines, Longmont; Michael McNeil, Boulder, both of Colo.

[73] Assignee: Maxtor Corporation, San Jose, Calif.

[21] Appl. No.: 109,817

[22] Filed: Aug. 20, 1993

[51] Int. Cl.$^5$ .............................................. G11B 5/42
[52] U.S. Cl. ........................................ 29/603; 360/119; 360/122
[58] Field of Search .................. 29/603; 360/119, 120, 360/122, 125, 127

[56] References Cited

U.S. PATENT DOCUMENTS 4,875,987 10/1989 Wada et al. ................... 29/603 X
5,163,218 11/1992 Hamilton ......................... 29/603

Primary Examiner—Carl E. Hall
Attorney, Agent, or Firm—Blakely, Sokoloff, Taylor & Zafman

[57] ABSTRACT

A method of constructing a ferrite magnetic head that can be used for vertical recording. The head is created by first bonding a non-magnetic shoe to the legs of a C-Shaped magnetic core to create a block assembly. A pole surface of the block is then lapped and sputtered with a magnetic pole material. A layer of alumina is then sputtered onto the magnetic pole material. After sputtering, the block is ground to create air bearing grooves and a plurality of poles. The bearing surface of the block is then lapped to the apex of an oblique interface between the shoe and core to create the throat of the pole. The block is cut into individual transducer cores which are then wrapped with a wire coil and attached to a flexbeam.

16 Claims, 2 Drawing Sheets

METHOD OF MAKING A VERTICAL RECORDING HEAD FOR CONTACT AND NEAR CONTACT MAGNETIC RECORDING

BACKGROUND OF THE INVENTION

1. Field of the Invention

The present invention relates to a method of constructing a magnetic head for a hard disk drive.

2. Description of Related Art

Hard disk drives contain a magnetic disk which spins relative to an actuator arm assembly. At the end of the actuator arm is a magnetic head which can magnetize and sense the magnetic field of the disk. The head has a coil wrapped around a magnetic core. The core has a pole that is separated from a magnetic return path by a gap. The gap in a conventional head is kept relatively narrow to maintain the strength of the magnetic flux between the pole and return path.

The surface of the disk is magnetized in one of two opposite directions parallel with the radial axis of the disk. A change in direction is typically interpreted as a binary 1. Two consecutive readings in the same direction are treated as a binary 0. Magnetizing the surface of the disk parallel to the radial axis is commonly referred to as longitudinal recording.

There has been developed magnetic heads which have a relatively large separation between the pole and the magnetic return path. Such an arrangement causes the magnetic flux of the head to flow through the disk in a direction perpendicular to the radial axis. The material of the disk therefore becomes magnetized in a direction perpendicular to the radial axis. Magnetizing across the thickness of the disk is commonly referred to as vertical recording. Because magnetization is occurring through the disk thickness, instead of across the disk surface, vertical recording can potentially provide higher data densities than longitudinal recording techniques.

Magnetic heads are typically constructed to create an air bearing between the head and the surface of the disk. The air bearing prevents contact between the head and disk surface, and wear on the two members. Vertical recording heads create a longer flux path than conventional longitudinal recording heads. The air bearing between the head and the disk further increases the flux path. For vertical recording, it is desirable to provide a head that is in contact with the spinning disk. Unfortunately most conventional magnetic heads are heavy and thus cause excessive stiction and wear when used in contact recording.

U.S. Pat. No. 5,041,932 issued to Hamilton and assigned to Censtor Corp., discloses a magnetic head that is light enough (approximately 1.5 milligrams) to allow contact recording without excessive wear on the disk or head. Consequently, the Censtor head could be potentially used for vertical recording. The Censtor head is constructed with processes similar to constructing an integrated circuit, including steps of plating metal and sputtering dielectric material to create a conductive coil that spirals around a magnetic core. Although the Censtor magnetic head is lightweight, it is also very expensive to produce. It would therefore be desirable to provide a magnetic head that is inexpensive to produce and can be used for vertical recording.

SUMMARY OF THE INVENTION

The present invention is a method of constructing a ferrite magnetic head that can be used for vertical recording. The head is created by first bonding a non-magnetic shoe to the legs of a C-shaped magnetic core to create a block assembly. A pole surface of the block is then lapped and sputtered with a magnetic pole material. A layer of alumina is then sputtered onto the magnetic pole material. After sputtering, the block is grounded to create a plurality of air bearing grooves and a number of poles. The bearing surface of the block is then lapped to the apex of an oblique interface between the shoe and core to create the throat of the pole. The block is cut into individual transducer cores which are then wrapped with a wire coil and attached to a flexbeam.

It is therefore an object of the present invention to provide a ferrite magnetic head which is inexpensive to produce and can be used for vertical recording.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
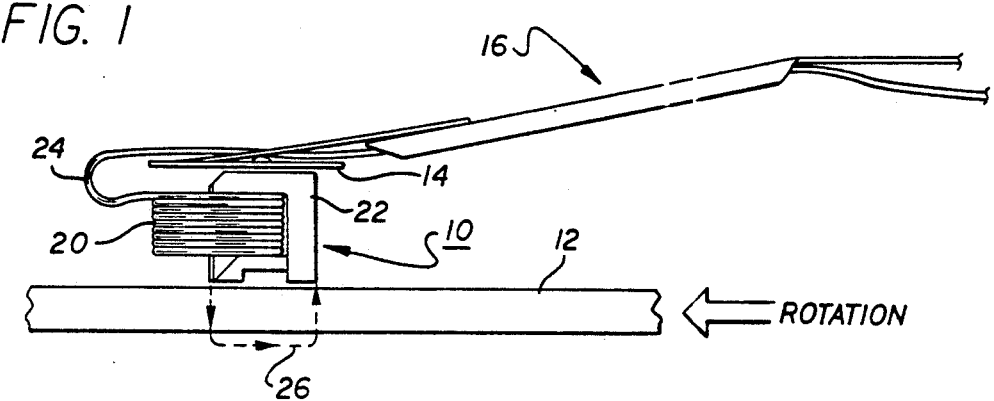
FIG. 1 is a side view showing a magnetic disk rotating relative to a magnetic head of the present invention.
Figure 2A:
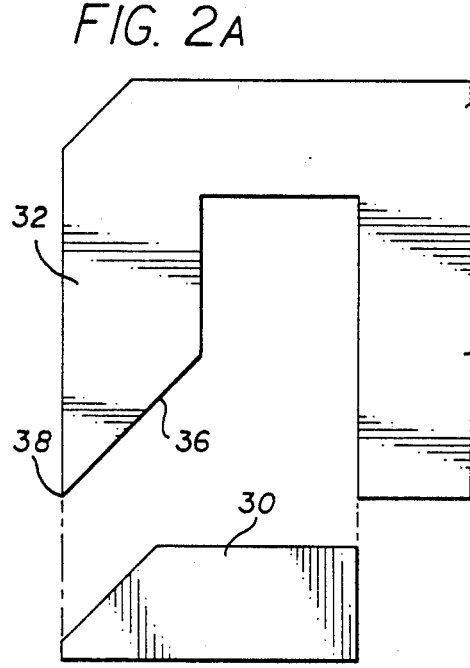
FIGS. 2a-b are side views showing a non-magnetic shoe being bonded to a ferrite magnetic core.
Figure 2B:
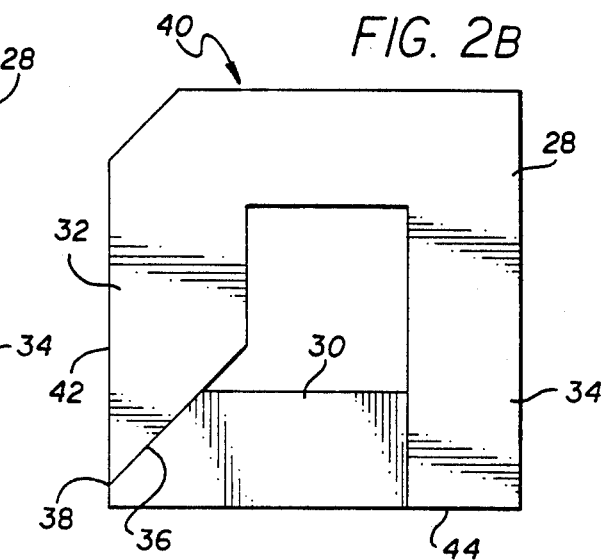

Referring to the drawings more particularly by reference numbers, FIG. 1 shows a magnetic head 10 adjacent to a magnetic disk 12. The disk 12 is typically rotated relative to the head 10 by a spin motor (not shown) in the direction indicated by the arrow. The head 10 is mounted to a flexure 14 which is cantilevered off of an actuator arm 16. The actuator arm assembly 16 contains a voice coil motor (not shown) which can move the head 10 relative to the disk 12.

The head 10 includes a wire coil 20 wrapped around a magnetic core 22. The coil 20 is coupled to the electronics (not shown) of the disk drive by a pair of coil leads 24. Providing a current to the coil 20 creates a magnetic flux 26 which flows along a flux path indicated by the arrows. The flux flows through the thickness of the disk 12, such that the disk 12 becomes magnetized in a direction perpendicular to the radial axis of the disk 12. The vertical direction of the magnetic flux 26 is created by separating the pole and the return path of the core 22 by a relatively large gap. The technique of magnetizing the disk in a direction perpendicular to the radial axis is commonly referred to as vertical recording.

FIGS. 2-6 show a preferred method of constructing the magnetic head 10. There is initially provided a magnetic C shaped core 28 and a non-magnetic shoe 30. The core 28 is preferably constructed from a magnetic zinc ferrite material, which has a first leg 32 and second leg 34. The spacer 30 is bonded directly to the legs of the core 28, preferably with a bonded glass. It is not critical that all of the gaps between the shoe 30 and the core 28 are filled, because these areas are not in the flux path. The first leg 32 and shoe 30 have an oblique interface 36 that has an apex 38.

The assembled boot 28 and spacer 30 create a block assembly 40 which has a pole surface 42 and a bearing surface 44. A rough grind of the bearing surface 44 is performed after the shoe 30 is bonded to the core 28. The pole surface 42 is then lapped to a fine surface finish.

Figure 3:
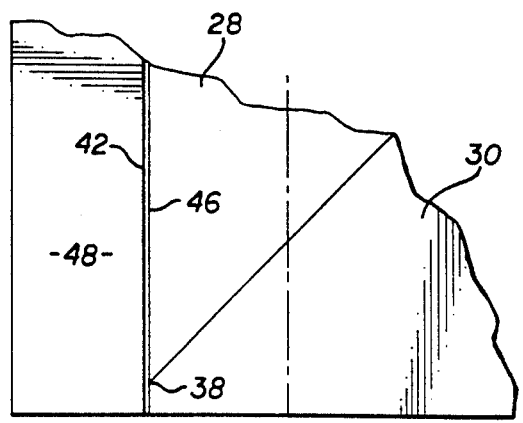
FIG. 3 is a side view of an assembly block with a layer of magnetic pole material and a layer of alumina sputtered onto a surface of the block.

As shown in FIG. 3, a layer of magnetic pole material 46 is sputtered onto the pole surface 42. The magnetic pole material 46 may be constructed out of CoZrNb, or a composition of iron, alumina and silicate commonly sold under the trademark "SENDUST". A protective layer of alumina 48 is sputtered onto the pole material 46.

Figure 4:
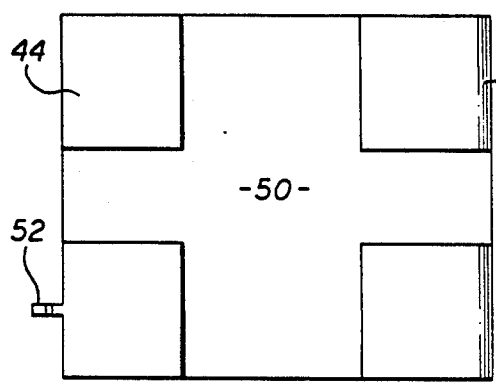
FIG. 4 is a bottom view showing air bearing notches and poles ground out of the block.

As shown in FIG. 4, air bearing notches 50 and a plurality of poles 52 are grounded out of the block 40. The air bearing notches 50 are constructed to create an air bearing that places the pole 52 in near contact with the surface of the disk 12. Due to irregularities in the flatness of the disk and the tolerances in the hard disk assembly, the pole 52 may at various intervals be in actual contact with the disk. For a more complete discussion of the near contact characteristics of the head, see application Ser. No. 08/069,991, assigned to the Maxtor Corp., the same assignee of the present invention.

Figure 5:
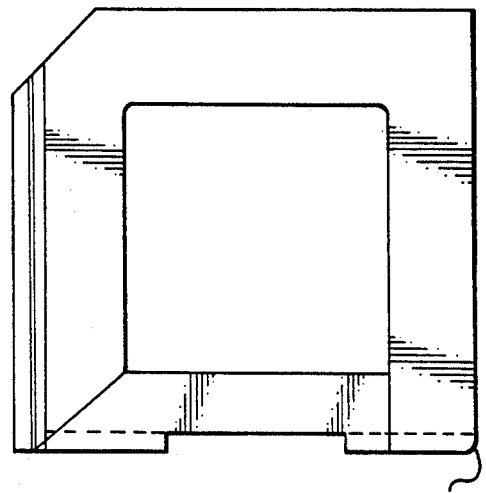
FIG. 5 is a side view of the block assembly lapped to a final condition.

As shown in FIG. 5, after the air bearings 50 and poles 52 are formed, the bearing surface 44 is lapped to the apex 38 of the oblique interface 36 of the block 40, to create the throats of the poles 52. The edge 54 of the block 40 is then blended to create a radius. In the preferred embodiment, the edge 54 is provided with a radius of approximately 0.001 inches. The radius creates a lifting surface that assist in the formation of the air bearing.

Figure 6:
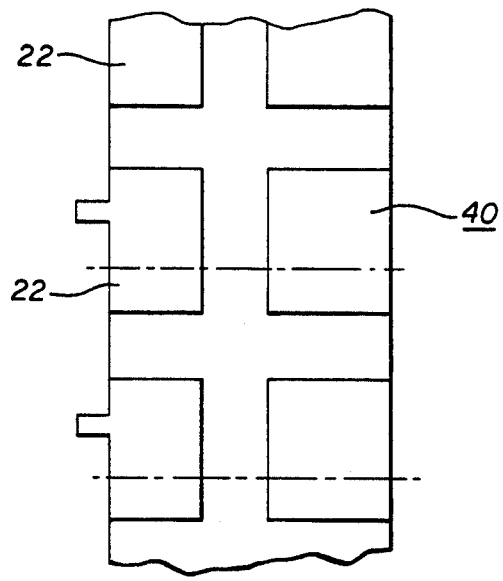
FIG. 6 is a bottom view showing a plurality of individual heads being cut out of the assembly block.

As shown in FIG. 6, the block 40 is then cut up into a plurality of individual transducers cores 22. Wire is then wrapped around the first leg 32 of the core 28 to create the coil 20. The head 10 is then bonded to the flexure 14 and the coil wires 24 are coupled to the electronics.

What is thus provided is an inexpensive ferrite magnetic heads which can be used for vertical recording. As an alternate embodiment, instead of wrapping wire around the first leg, thin film techniques may be used to create coils on the back of the core.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for constructing a transducer core used in a transducer which aligns a magnetic field of a magnetic disk in a direction parallel with a radial axis of the magnetic disk, comprising the steps of:
   a) attaching a non-magnetic shoe to a pair of legs of a C shaped magnetic core to create a non-magnetic/-magnetic assembly, wherein said non-magnetic/-magnetic assembly has a pole surface and a bearing surface;
   b) lapping said pole surface of said assembly;
   c) applying a magnetic pole material to said pole surface;
   d) applying a layer of protective material to said magnetic pole material;
   e) forming a notch in said non-magnetic shoe along said bearing surface of said assembly;
   f) forming a pole in said pole surface of said assembly; and,
   g) lapping said bearing surface.

2. The method as recited in claim 1, further comprising the step of blending said magnetic core to create a radius in an edge of said assembly opposite from said pole.

3. The method as recited in claim 1, further comprising the step of cutting a block assembly which has a plurality of poles, wherein there are created a plurality of individual transducers.

4. The method as recited in claim 1, further comprising the step of wrapping a coil around said magnetic core to create a transducer.

5. The method as recited in claim 1, wherein said forming steps (e) and (f) are performed by grinding said materials.

6. The method as recited in claim 1, wherein said applying step (c) includes sputtering a material comprising iron, alumina and silicate.

7. The method as recited in claim 1, wherein said applying step (d) includes sputtering alumina or other protective structure onto said pole material.

8. The method as recited in claim 1, further comprising the step of grinding said bearing surface before said pole surface is lapped in step (b).

9. The method as recited in claim 1, wherein said non-magnetic shoe is glass bonded to said magnetic core.

10. A method for constructing a transducer core used in a transducer which aligns a magnetic field of a magnetic disk in a direction parallel with a radial axis of the magnetic disk, comprising the steps of:
    a) attaching a non-magnetic shoe to a pair of legs of a C shaped magnetic core to create a non-magnetic/-magnetic block assembly, wherein said block has a pole surface and a bearing surface, said non-magnetic shoe and said magnetic core having an oblique interface with an apex;
    b) lapping said pole surface of said block;
    c) sputtering a magnetic pole material onto said pole surface;
    d) sputtering a layer of protective material onto said magnetic pole material;
    e) grinding a notch in said non-magnetic shoe along said bearing surface of said block;
    f) grinding a plurality of poles in said pole surface of said block;
    g) lapping said bearing surface to said apex of said oblique interface; and,
    h) cutting said block into a plurality of transducer cores such that each core has a pole.

11. The method as recited in claim 10, further comprising the steps of wrapping a coil around said magnetic core of each transducer.

12. The method as recited in claim 11, further comprising the step of blending said magnetic core to create a radius in an edge of said block opposite from said pole, after said bearing surface is lapped in step (g) and before said block is cut in step (h).

13. The method as recited in claim 12, further comprising the step of grinding said bearing surface before said pole surface is lapped in step (b).

14. The method as recited in claim 13, wherein said protective material includes alumina, or other protective material.

15. The method as recited in claim 14, wherein said magnetic pole material includes iron, alumina, silicon, cobalt, zirconium, niobium, or other high saturation magnetic materials.

16. The method as recited in claim 15, wherein said non-magnetic shoe is glass bonded to said magnetic core.

* * * * *